UNITED STATES PATENT OFFICE.

HUGO MICHAELIS, OF BERLIN, ASSIGNOR TO GEBR. STOLLWERCK, OF COLOGNE-ON-THE-RHINE, PRUSSIA, GERMANY.

MANUFACTURE OF EFFERVESCENT SUGAR.

SPECIFICATION forming part of Letters Patent No. 284,464, dated September 4, 1883.

Application filed June 26, 1883. (No specimens.) Patented in Germany October 4, 1881, No. 18,339.

*To all whom it may concern:*

Be it known that I, HUGO MICHAELIS, of the city of Berlin, in the Kingdom of Prussia and German Empire, have invented certain new and useful Improvements in the Manufacture of Effervescent Sugar, of which the following is a specification.

My invention relates to the manufacture of effervescent sugar; and the object of the said invention is to prepare such sugar so that the substances or ingredients which the said sugar contains for producing the carbonic acid when combined with water are kept separate from each other instead of being mixed with each other, as heretofore.

For this purpose the said invention consists in combining the substances as hereinafter specified.

The sugar, before being mixed with the bicarbonate of soda, may preferably be flavored by adding to it some suitable volatile oil or perfumes, so as to give it a flavor of raspberry, apple, ginger, pine-apple, or other fruit; or the said sugar may also be mixed with some medicine or drug in a pulverized state, such as chininum sulphuricum, ferrum oxidatum, dialysatum, santoninum, or other. Part of the said mixture of sugar and bicarbonate of soda is then brought into a mold or die, preferably of a square shape and of convenient size, and is stamped down therein by means of a suitable stamper or pestle. Then by means of some proper instrument a cavity is made in the center of the said mass having thus been stamped down, and into the said cavity is introduced a proper amount of pulverized citric or tartaric acid, which is then also stamped down therein, whereupon another part of the said compound of sugar and bicarbonate of soda is placed on top of the said acid and stamped down thereon, so that the said acid forms the core of the said surrounding compound of sugar and bicarbonate of soda. The entire mass, after having thus been thoroughly stamped down, is allowed to remain in the said mold for some time, and is then taken out of the said mold. If the latter is of a square shape, as may be considered preferable, the said mass will be of a square shape likewise— that is to say, the lumps of effervescent sugar thus obtained will be of the shape of a hexahedron, containing the said carbonate and the said acid separated from each other, said arrangement providing against a premature reaction in case of moisture and causing the said effervescent sugar to keep without spoiling.

It is obvious that instead of mixing the carbonate with the sugar the latter may also be mixed with the said acid, and the carbonate be introduced into the said cavity provided in the center of the mixed mass after the same has been stamped down, as above described. In this latter instance the said carbonate would form the core of the said surrounding compound of sugar and acid.

In using the said lumps of effervescent sugar thus obtained the same are crushed in some suitable vessel, whereupon water or other suitable liquid is added, which will cause the mixture to effervesce and produce a refreshing drink similar to sparkling lemonade.

The before-mentioned ingredients applied for preparing the said pieces or lumps of effervescent sugar, as herein described, are preferably made use of in about the following proportions—that is to say, flavored or non-flavored, drugged or non-drugged sugar, five parts, by weight, more or less; bicarbonate of soda, one part, by weight, more or less; and citric acid or tartaric acid, one part, by weight, more or less.

The said mold or die wherein the said pieces or lumps of effervescent sugar are stamped down and shaped may be of any convenient or known form and construction. The square shape, though, is preferred for the said mold; but any other sectional form may be used for the same, it being necessary only to conform to the respective shape of mold used the shape of the said pestle or stamper applied for stamping down the said sugar, carbonate, and acid. The said lumps of effervescent sugar are preferably made of such size as to measure about three-fourths to one inch in every direction.

Having thus described my invention, what I claim as new, and desire to secure by Letters Patent, is—

1. As a new article of manufacture, the herein-described lump of effervescent sugar, which consists of pulverized sugar suitably flavored and readily soluble in water, said pulverized sugar surrounding a carbonate and being mixed with an acid, substantially as and for the purpose set forth.

2. As a new article of manufacture, the herein-described lump of the effervescent sugar for medicinal use, which consists of pulverized sugar suitably drugged and readily soluble in water, said drugged sugar being mixed with a carbonate and surrounding an acid, substantially as and for the purpose set forth.

3. In the art of manufacturing effervescent sugar, the process, substantially as herein set forth, which consists in flavoring pulverized sugar, then mixing the same with bicarbonate of soda, and introducing into the said mixture a core of citric or tartaric acid, substantially as and for the purpose set forth.

4. In the art of manufacturing effervescent sugar, the process, substantially as herein set forth, which consists in drugging pulverized sugar, then mixing the same with citric or tartaric acid, and introducing into the said mixture a core of bicarbonate of soda, substantially as and for the purpose specified.

In testimony whereof I have signed my name to this specification in the presence of two subscribing witnesses.

HUGO MICHAELIS.

Witnesses:
ROBERT P. SCHMIDT,
B. ROI.